(12) United States Patent
Tsutsui

(10) Patent No.: US 6,744,233 B1
(45) Date of Patent: Jun. 1, 2004

(54) SERVO CONTROLLER AND METHOD

(75) Inventor: Kazuhiko Tsutsui, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/169,015

(22) PCT Filed: Nov. 1, 2000

(86) PCT No.: PCT/JP00/07701

§ 371 (c)(1),
(2), (4) Date: Jun. 26, 2002

(87) PCT Pub. No.: WO02/39574

PCT Pub. Date: May 16, 2002

(51) Int. Cl.[7] ............................................. G05B 11/01
(52) U.S. Cl. .................. 318/560; 318/567; 318/569; 318/572; 318/600; 318/609; 318/610
(58) Field of Search ................ 318/560, 567, 318/569, 572, 600, 609, 610, 632, 671

(56) References Cited

U.S. PATENT DOCUMENTS

| | | | | |
|---|---|---|---|---|
| 5,134,354 A | * | 7/1992 | Yamamoto | 318/609 |
| 5,418,440 A | * | 5/1995 | Sakaguchi et al. | 318/560 |
| 5,598,077 A | * | 1/1997 | Matsubara et al. | 318/568.22 |
| 5,691,616 A | * | 11/1997 | Iwashita | 318/615 |
| 6,274,994 B2 | * | 8/2001 | Tsutsui | 318/560 |

FOREIGN PATENT DOCUMENTS

| | | |
|---|---|---|
| JP | 63-138401 | 6/1988 |
| JP | 63-269212 | 11/1988 |
| JP | 1-276315 | 11/1989 |
| JP | 3-150610 | 6/1991 |
| JP | 6-161559 | 6/1994 |
| JP | 6-161560 | 6/1994 |
| JP | 9-74783 | 3/1997 |
| JP | 11-282538 | 10/1999 |
| JP | 2000-10612 | 1/2000 |

* cited by examiner

Primary Examiner—Rina I Duda
(74) Attorney, Agent, or Firm—Sughrue Mion, PLLC

(57) ABSTRACT

An ideal position is calculated based on an ideal servo system model, the difference between the calculated ideal position and the actual position feedback is multiplied by a predetermined gain only for a predetermined time from the direction reversing time of the ideal position, and the result is added to the speed command as the correction amount, so that variations in the correction effect, caused by the effect of a secular variation of the friction amount and the work condition difference is suppressed and even in a machine system with large elastic change in torsion of a ball screw, a seal material, etc., undercut caused by torsion restoration after the correction, etc., is suppressed and a servo system is prevented from becoming unstable.

24 Claims, 18 Drawing Sheets

SPEED AND CURRENT WAVEFORM IN QUADRANT A (EMBODIMENT 1)

SPEED AND CURRENT WAVEFORM IN QUADRANT B

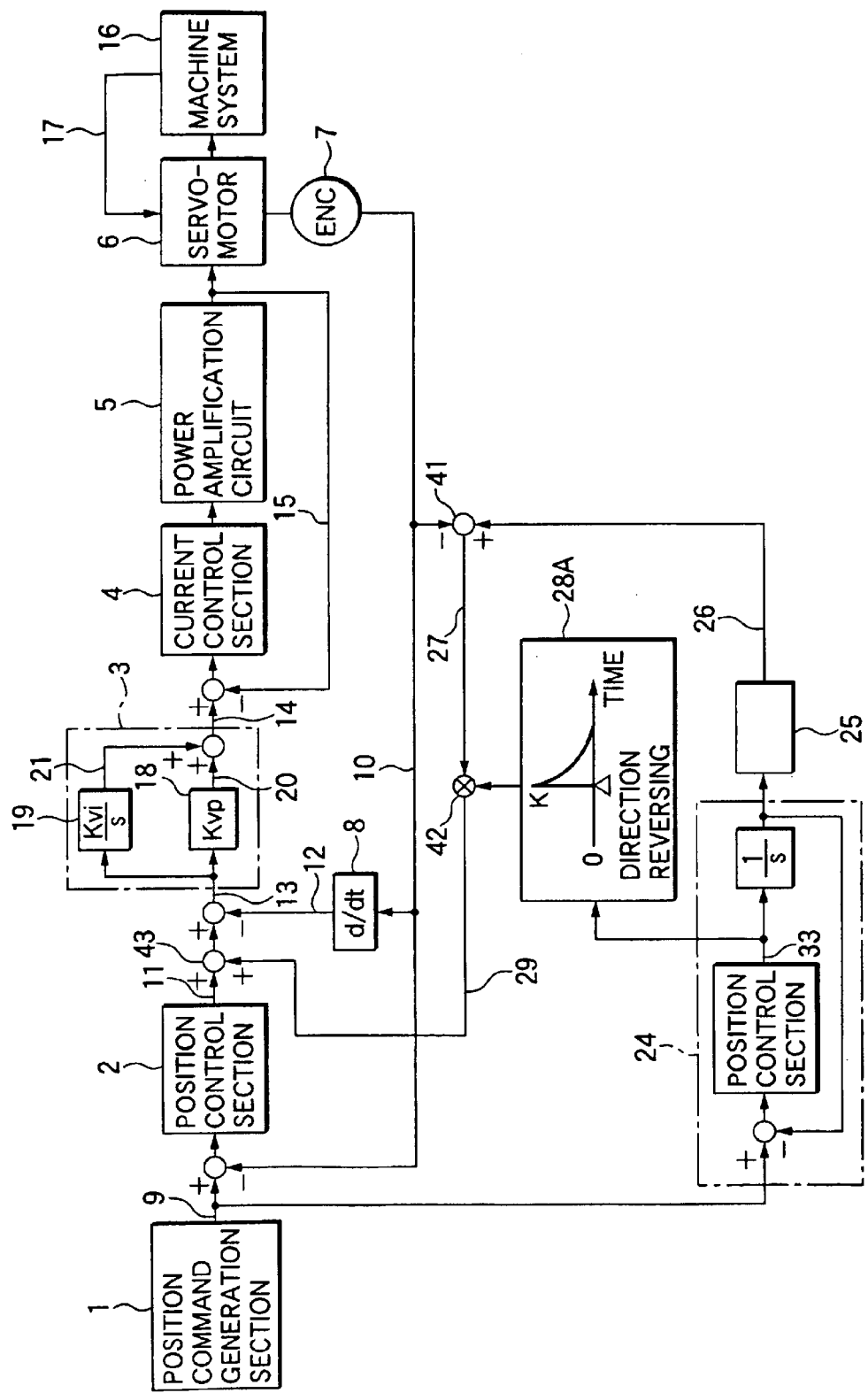

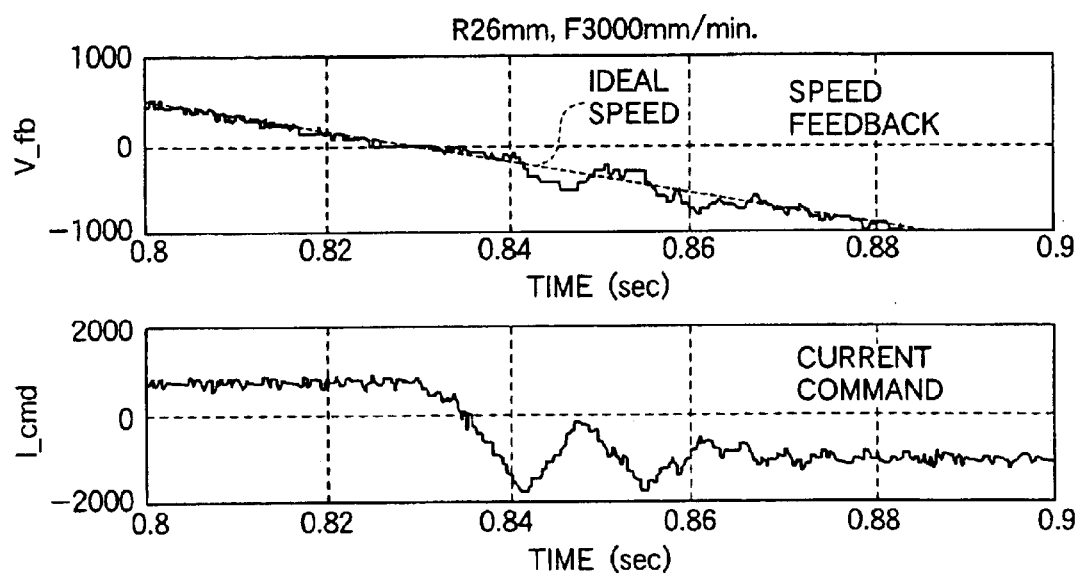

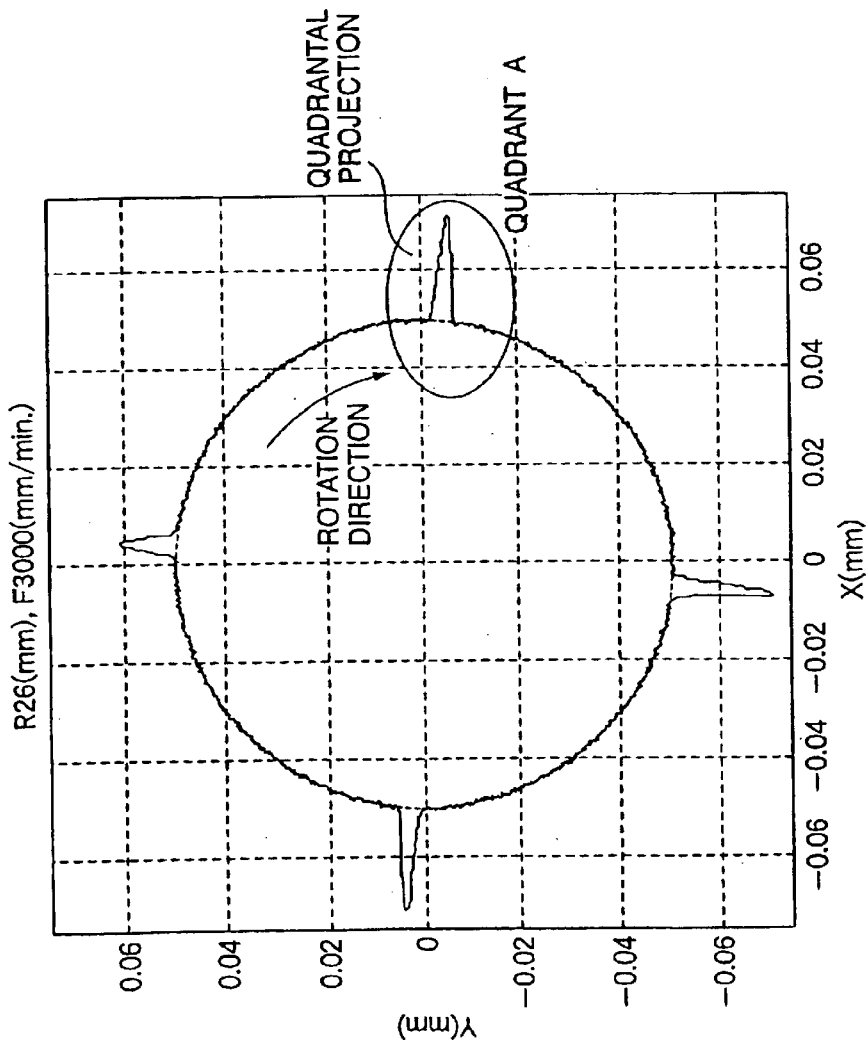

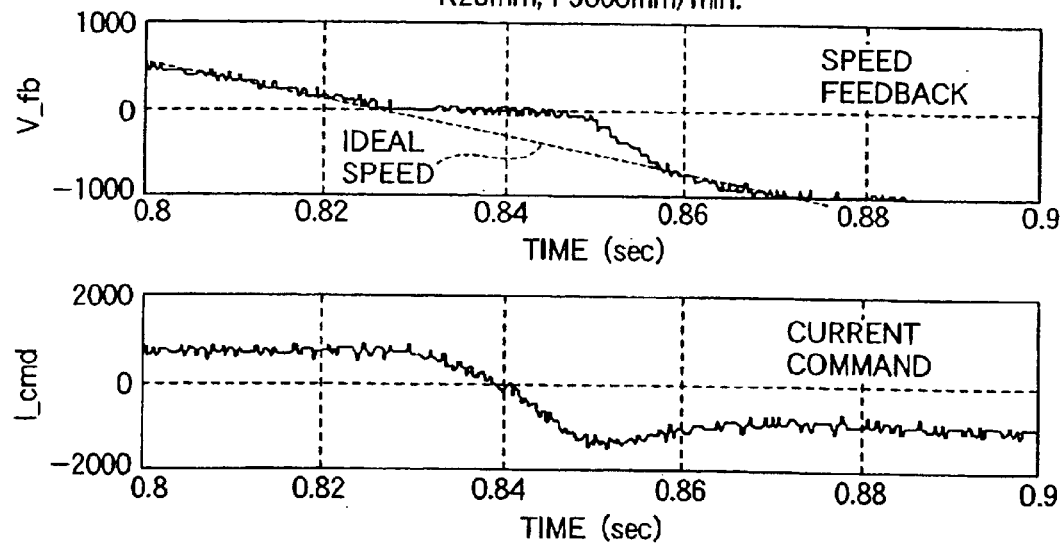

SPEED AND CURRENT WAVEFORM IN QUADRANT A
(CORRECTION IN RELATED ART)

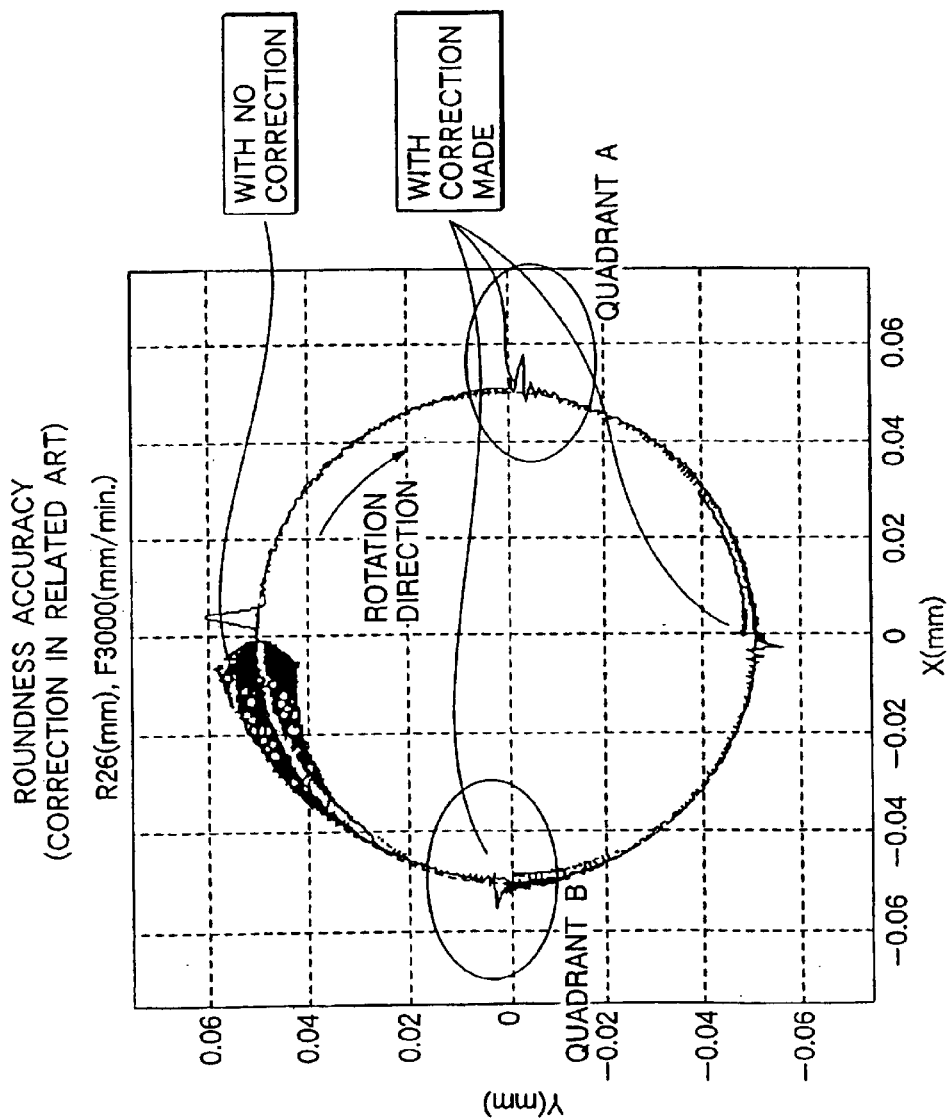

SPEED AND CURRENT WAVEFORM IN QUADRANT A (CORRECTION IN RELATED ART)

SPEED AND CURRENT WAVEFORM IN QUADRANT B (CORRECTION IN RELATED ART)

US 6,744,233 B1

SERVO CONTROLLER AND METHOD

TECHNICAL FIELD

This invention relates to a method and an apparatus for controlling a servomotor for driving a CNC machine tool, etc.

BACKGROUND OF THE INVENTION

In a CNC machine tool, usually a servomotor rotates a ball screw for driving, thereby moving a table with a workpiece fixed. Thus, for example, to execute circular cutting, as well known, there is a problem of degrading work accuracy as the table move direction is not instantaneously switched due to backlash of the ball screw, the friction of each part of a machine, etc., and a projection called quadrantal projection occurs in the vicinity of the quadrant boundary on the cut face of the workpiece.

FIG. 9 is a block diagram of a servo control apparatus in a related art intended for preventing such a quadrantal projection from occurring, etc. In FIG. 9, numeral 1 denotes a position command generation section, numeral 2 denotes a position control section, numeral 3 denotes a speed control section, numeral 4 denotes a current control section, numeral 5 denotes a power amplification circuit, numeral 6 denotes a servomotor for driving a machine system 16, numeral 7 decodes an encoder or detecting the rotation position of the servomotor 6, and numeral 8 denotes differentiating means for differentiating a position detection signal 10 output by the encoder 7 to calculate speed. The encoder 7 and the differentiating means 8 make up motor speed detection means. Numeral 9 denotes a position command output from the position command generation section 1, numeral 10 denotes position feedback of the position detection signal output from the encoder 7, numeral 11 denotes a speed command output from the position control section 2, numeral 12 denotes speed feedback of a speed detection signal output from the differentiating means 8, numeral 13 denotes a speed deviation signal of the difference between the speed command 11 and the speed feedback 12, numeral 14 denotes a current command output from the speed control section 3, numeral 15 denotes a current feedback signal indicating a current flowing into the servomotor 6, numeral 16 denotes the machine system of a CNC machine tool, etc., driven by the servomotor 6, numeral 17 denotes load torque produced by the reaction force applied from the machine system 16 to the servomotor 6 or friction, numeral 18 denotes a speed proportional control section in the speed control section 3, numeral 19 denotes a speed integration control section in the speed control section 3, numeral 20 denotes a proportional term command output by the speed proportional control section 18, and numeral 21 denotes an integration term command output by the speed integration control section 19, the integration term command being added to the proportional term command 20 to generate the current command 14.

Numeral 22 denotes a correction signal generation section for suppressing an error relative to the command position occurring when the direction of the servomotor 6 or the machine is reversed by the effect of friction, etc., and preventing a quadrantal projection from occurring, etc., when circular cutting is executed, and numeral 23 denotes a current command correction signal (correction value) output by the correction signal generation section 22.

In the apparatus in the related art, the correction value 23 corresponding to the frictional amount is added when the direction of the servomotor 6 is reversed, and as the correction amount, the value preset as a parameter is used or the optimum value for each condition of the feed rate and acceleration stored in memory is used. The correction amount is added as a time function or a travel distance or feed rate function in some cases.

However, in the servo control apparatus in the related art, as the above-mentioned correction amount, the optimum value under a predetermined condition needs to be previously determined at the machine adjusting time, and the frictional amount, etc., of the error cause at the direction reversing time changes largely due to a secular variation and the difference in the condition of the machine position, etc., and it is difficult to determine the optimum correction amount.

Even if the correction amount is determined, the optimum effect becomes hard to provide with the passage of time; this is a problem.

Further, in the machine system with large elastic change in torsion of the ball screw, a seal material (being provided slidably in the surrounding of the shaft of the servomotor, etc., so as to prevent oil, etc., from entering the servomotor side, the outer peripheral part of the seal material being fixed to base section), etc., a correction can be made to an error caused by a follow-up delay (quadrantal projection) occurring at the direction reversing time, but undercut caused by later torsion restoration, etc., cannot be suppressed. FIGS. 10A and 10B show simulation of behavior at the direction reversing time before correction in a machine system with large elastic change in torsion of a ball screw, a seal material, etc.; FIG. 10A shows roundness accuracy and FIG. 10B shows speed and current waveform at the direction reversing time. The result of making correction in the related art shown in FIG. 9 in such a machine system is shown in FIGS. 11A and 11B. In FIGS. 11A and 11B, FIG. 11A shows roundness accuracy and FIG. 11B shows speed and current waveform at the direction reversing time.

In the correction in the related art, the correction value corresponding to the frictional amount is added at the direction reversing time in such a manner that the correction amount is gradually increased in response to the distance from the direction reversing. To apply to a system having elasticity of torsion, etc., in machine system, the correction value may result in over correction instantaneously as shown in FIGS. 11A and 11B and even in such a case, means for changing the correction value does not exist and thus undercut occurs.

An apparatus shown in FIG. 12 exits as a servo control apparatus in another related art.

Shown in FIG. 12 is the invention disclosed in JP-A-1-276315. In the figure, Xc denotes a position command, numeral 101 denotes a subtracter for comparing the position command Xc with an output signal X of a position detector 106 for performing subtraction and outputting deviation E, numeral 102 denotes an amplifier for amplifying the deviation E and outputting a speed command V, numeral 103 denotes a speed controller for controlling drive output to a servomotor 104 in response to the input speed command V, numeral 105 denotes a working machine wherein, for example, a working tool is moved or a working table on which a workpiece is placed is moved by drive of the servomotor 104, numeral 106 denotes a position detector for detecting the position of the above-mentioned mobile unit in the working machine 105, and numeral 107 denotes an ideal position calculator. This ideal position calculator 107 is made up of a subtracter 108 for outputting deviation Ei between the position command Xc and an ideal position Xi, an amplifier 109 for amplifying the deviation Ei and outputting a speed signal Vi, and an integrator 110 for performing time quadrature of the speed signal Vi (speed command) and outputting an ideal position signal Xi corresponding to the ideal position.

Numeral 111 denotes a subtracter for outputting the deviation between the deviation Ei and the deviation E, numeral 112 denotes an amplifier for multiplying the deviation output by he subtracter 111 by a correction gain, and numeral 113 denotes an adder for adding the deviation multiplied by the correction gain to the speed command V.

The servo control apparatus adds the result of multiplying the error between the ideal position and the actual position by the gain and amplifying the multiplication result to the speed command V so as to decrease the speed command V when the position detected by the position detector 106 is ahead of the ideal position and increase the speed command V when the position is behind the ideal position.

However, the apparatus shown in FIG. 12 always amplifies the error between the ideal position and the actual position for making a correction as well as at the direction reversing time and thus involves problems of easily inducing machine resonance and vibration and being unstable and if the gain is set attaching importance to safety, being incapable of sufficiently suppressing the error caused by a follow-up delay occurring at the direction reversing time. FIGS. 13A to 13C show simulation of behavior when correction in the invention disclosed in JP-A-1-276315 is made to the machine system with large elastic change in torsion of a ball screw, a seal material, etc., shown in FIGS. 11A and 11B; FIG. 13A shows roundness accuracy and FIG. 13B shows speed and current waveform at the direction reversing time. Machine vibration is easily induced and the position, the speed, and the current waveform are like vibration and quadrantal projections in the roundness accuracy are also left comparatively large.

DISCLOSURE OF THE INVENTION

The invention is intended for solving the problems as described above and it is an object of the invention to provide a servo control method and its apparatus capable of suppressing variations in the correction effect, caused by the effect of a secular variation of the friction amount and the work condition difference and even in a machine system with large elastic change in torsion of a ball screw, a seal material, etc., suppressing undercut caused by torsion restoration after the correction, etc., and moreover preventing a servo system from becoming unstable as the correction is made.

Then, according to the invention, there is provided a servo control method of generating a speed command based on the difference between a position command and actual position feedback, generating a current command based on the difference between the speed command and actual speed feedback, and controlling a servomotor based on the current command, wherein an ideal position is calculated based on an ideal servo system model, the difference between the calculated ideal position and the actual position feedback is multiplied by a predetermined gain only for a predetermined time from the direction reversing time of the ideal position, and the result is added to the above-mentioned speed command as the correction amount.

In the servo control method according to the invention, the above-mentioned gain is attenuated in a predetermined time as the maximum value at the direction reversing time of the ideal position.

In the servo control method according to the invention, the difference between the ideal position and the actual position feedback at the direction reversing time of the ideal position is stored as an offset value, the offset value is subtracted from the above-mentioned difference, and the subtraction result is multiplied by the above-mentioned gain.

According to the invention, there is provided a servo control method of generating a speed command based on the difference between a position command and actual position feedback, generating a current command based on the difference between the speed command and actual speed feedback, and controlling a servomotor based on the current command, wherein an ideal position is calculated based on an ideal servo system model, the above-mentioned position feedback or the cumulative position of the ideal servo system model is multiplied by a predetermined gain only for a predetermined time from the direction reversing time of the calculated ideal position, and the result is added to the above-mentioned current command as the correction amount.

In the servo control method according to the invention, the above-mentioned speed feedback or speed of the ideal servo system model is multiplied by a predetermined gain only for a predetermined time from the direction reversing time of the ideal position and the result is added to the above-mentioned current command as the correction amount.

In the servo control method according to the invention, a coefficient proportional to the difference between the ideal position and the actual feedback position is used as the above-mentioned gain.

According to the invention, there is provided a servo control apparatus comprising means for detecting the position and speed of a servomotor, a position control section for generating a speed command based on the difference between a position command and actual position feedback, a speed control section for generating a current command based on the difference between the above-mentioned speed command and actual speed feedback, and a current control section for controlling an electric current allowed to flow into the servomotor based on the above-mentioned current command for controlling the above-mentioned servomotor, and comprising an ideal servo system model, subtraction means for outputting the difference signal between an ideal position calculated by the model and the actual position feedback, and means for multiplying the difference signal output by the subtraction means by a predetermined gain only for a predetermined time from the direction reversing time of the ideal position and adding the result to the above-mentioned speed command as the correction amount.

In the servo control apparatus according to the invention, the above-mentioned gain is attenuated in a predetermined time as the maximum value at the direction reversing time of the ideal position.

The servo control apparatus according to the invention comprises storage means for storing the difference between the ideal position and the actual position feedback at the direction reversing time of the ideal position as an offset value and subtraction means for subtracting the offset value stored in the storage means from the above-mentioned difference, wherein the subtraction result provided by the subtraction means is multiplied by the above-mentioned gain.

According to the invention, there is provided a servo control apparatus comprising means for detecting the position and speed of a servomotor, a position control section for generating a speed command based on the difference between a position command and actual position feedback, a speed control section for generating a current command based on the difference between the above-mentioned speed command and actual speed feedback, and a current control section for controlling an electric current allowed to flow into the servomotor based on the above-mentioned current command for controlling the above-mentioned servomotor, and comprising an ideal servo system model and means for multiplying the above-mentioned position feedback or the cumulative position of the ideal servo system model by a predetermined gain only for a predetermined time from the direction reversing time of the ideal position of the model and adding the result to the above-mentioned current command as the correction amount.

The servo control apparatus according to the invention comprises means for multiplying the above-mentioned speed feedback or speed of the ideal servo system model by a predetermined gain only for a predetermined time from the direction reversing time of the ideal position of the above-mentioned model and adding the result to the above-mentioned current command as the correction amount.

In the servo control apparatus according to the invention, a coefficient proportional to the difference between the ideal position and the actual feedback position is used as the above-mentioned gain.

In the servo control method and its apparatus according to the invention, the above-mentioned ideal servo system model is a model considering a delay of a position loop system from the position command to the position feedback and a mechanical delay of an object to be controlled.

BRIEF DESCRIPTION OF THE DRAWINGS

FIG. 3 is a block diagram to show a servo control apparatus according to an embodiment 2 of the invention.

FIGS. 4A and 4B are drawings to show the simulation result when the servo control apparatus according to the embodiment 2 of the invention is applied to a machine system with large elastic change.

FIGS. 10A and 10B are drawings to show the simulation result when no correction is used in a machine system with large elastic change.

FIGS. 13A to 13C are drawings to show the simulation result when the servo control apparatus in the related art is applied to the machine system with large elastic change.

BEST MODE FOR CARRYING OUT THE INVENTION

Embodiment 1

Figure 1:
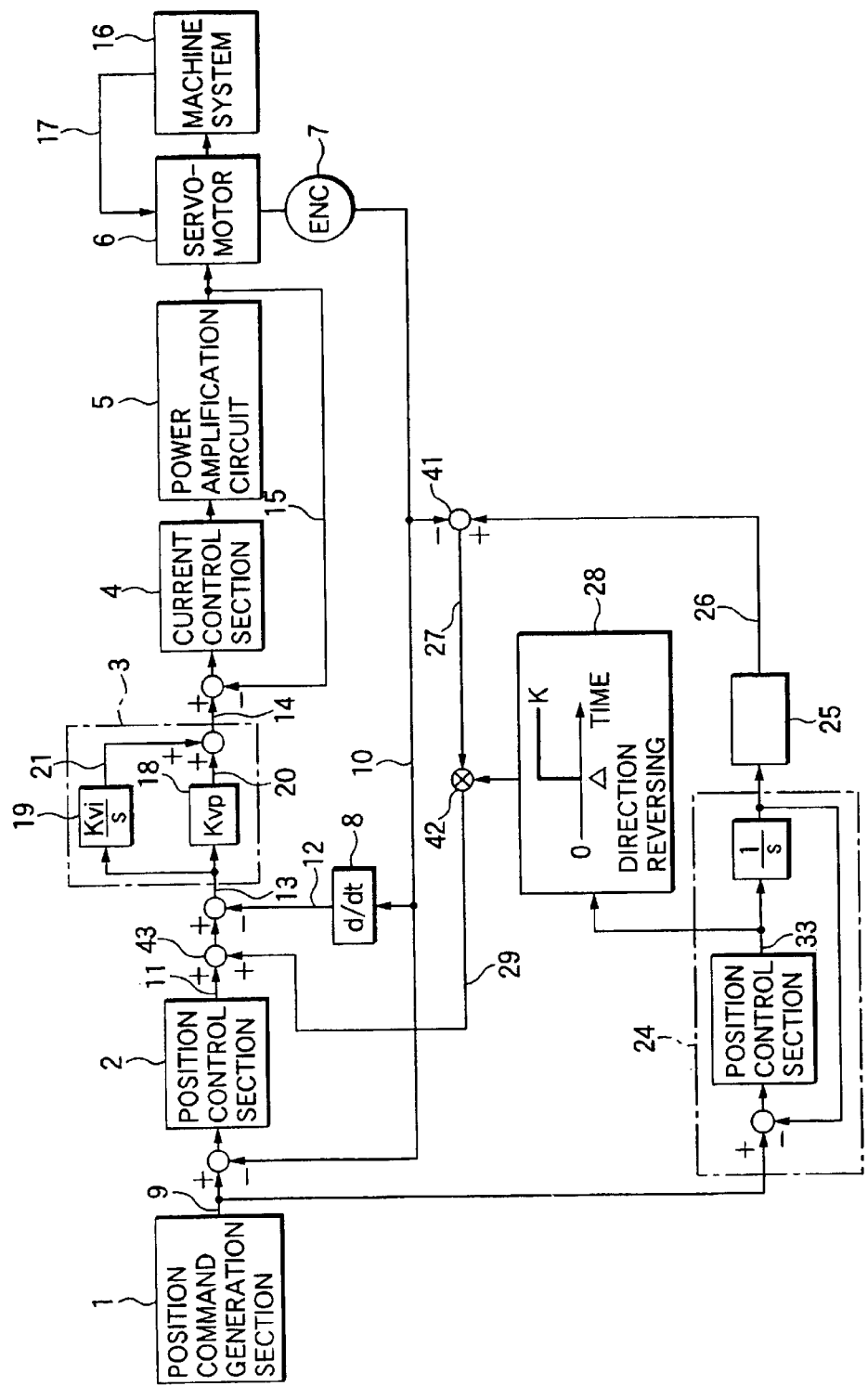
FIG. 1 is a block diagram to show a servo control apparatus according to an embodiment 1 of the invention.

FIG. 1 is a block diagram of a servo control apparatus according to an embodiment 1 of the invention.

In the figure, numeral 24 denotes an ideal model of a position loop system to which a position command 9 output from a position command generation section 1 is input, numeral 33 denotes an output speed signal of the ideal model 24 of the position loop system, numeral 25 denotes an ideal model considering a delay of a machine system with large elastic change, numeral 41 denotes a subtraction section for outputting a difference 27 between a position 26 of the ideal model and actual position feedback 10, and numeral 27 denotes a gain. As the gain 28 is set larger, the larger correction effect can be expected accordingly. In fact, however, to enhance the correction effect, responsivity of a speed loop control system containing the machine system is required and if the responsivity is poor, a servo system becomes unstable and thus to apply to an actual machine, the gain is determined depending on the speed loop control system. Numeral 42 denotes a multiplication section for multiplying the difference 27 between the position 26 of the ideal model and the actual position feedback 10 by the gain 28 and outputting a speed command correction signal (speed command correction value) 29, and numeral 43 denotes an addition section for adding the speed command correction signal (speed command correction value) 29 output by the multiplication section 36 to a speed command 11.

Figure 8:
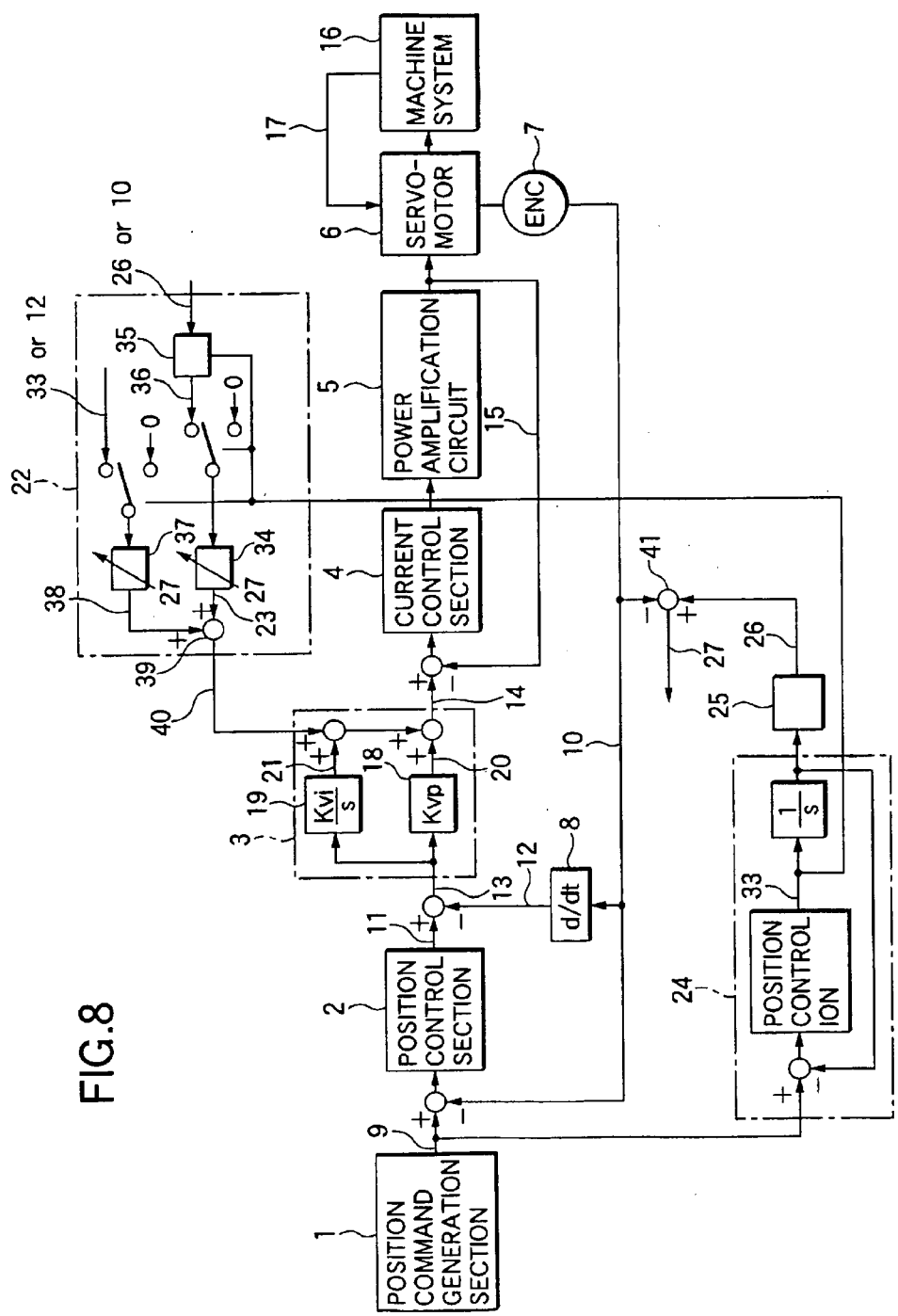
FIG. 8 is a block diagram to show a servo control apparatus according to an embodiment 6 of the invention.

The same numerals as those shown in FIG. 8 denote similar components to those shown in FIG. 8.

The servo control apparatus according to the embodiment 1 of the invention is configured as described above and the operation of the servo control apparatus is as follows: The time when the direction of the ideal model changes is adopted as correction timing and only for a predetermined time from the direction change time to the instant at which a current command becomes a value exceeding static friction (the predetermined time is preset in a parameter) or only for the time until the travel distance of the ideal model after direction reversing multiplied by a spring constant, etc., of the machine system becomes equal to or greater than a value exceeding static friction (the value is also preset in a parameter), the multiplication section 42 multiplies the difference 27 between the position 26 of the ideal model and the actual position feedback 10 by the gain 28, thereby generating the speed command correction value 29, and the addition section 43 adds the correction value 29 to the speed command 11 of position control output.

Figure 2A:
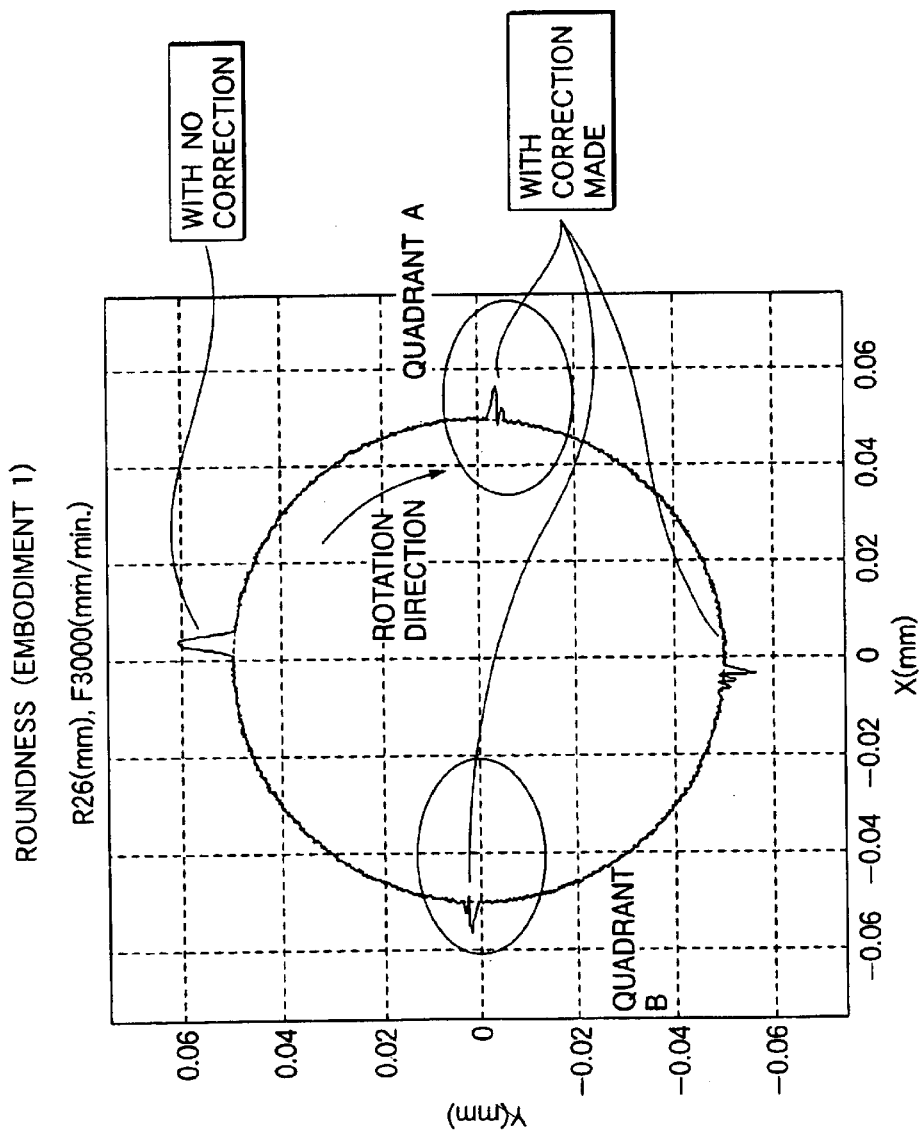
FIGS. 2A to 2C are drawings to show the simulation result when the servo control apparatus according to the embodiment 1 of the invention is applied to a machine system with large elastic change.
Figure 2B:
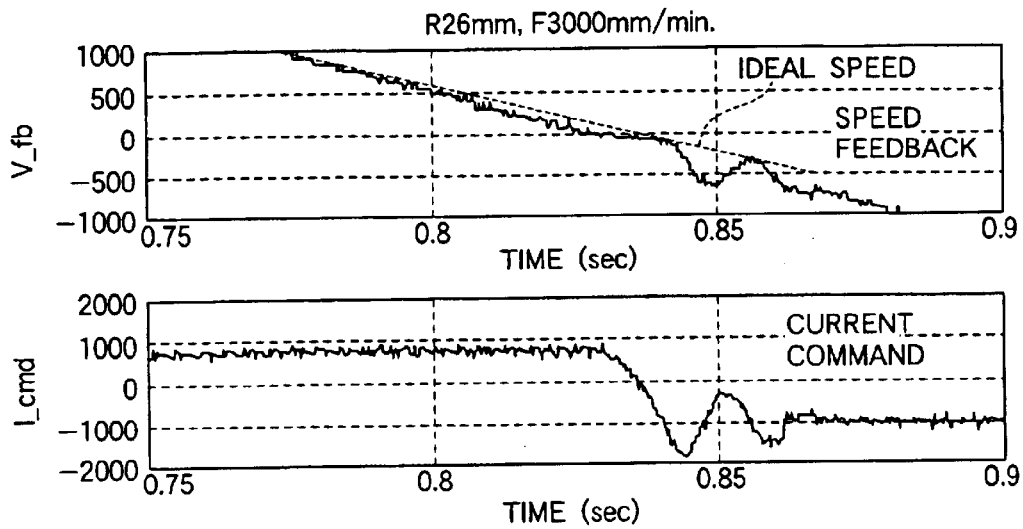
Figure 2C:
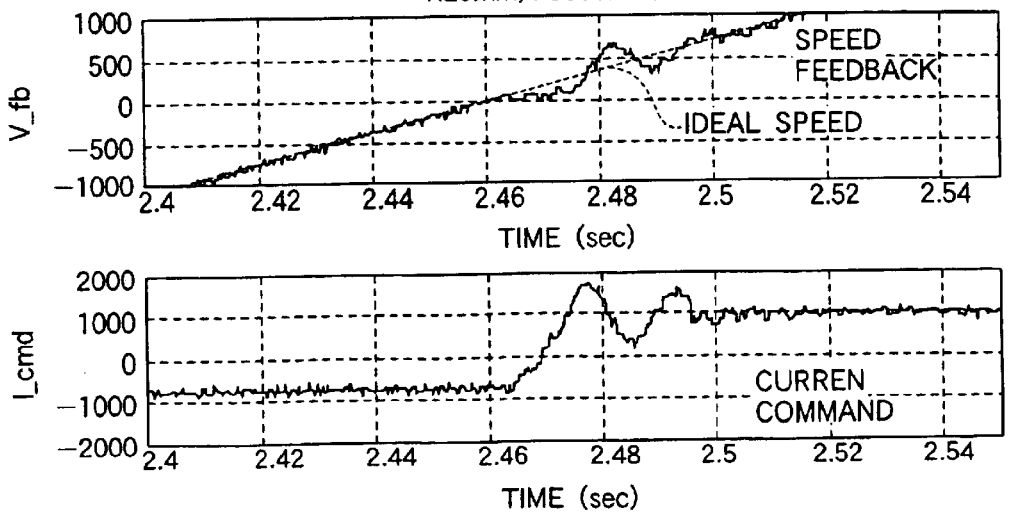
Figure 11A:
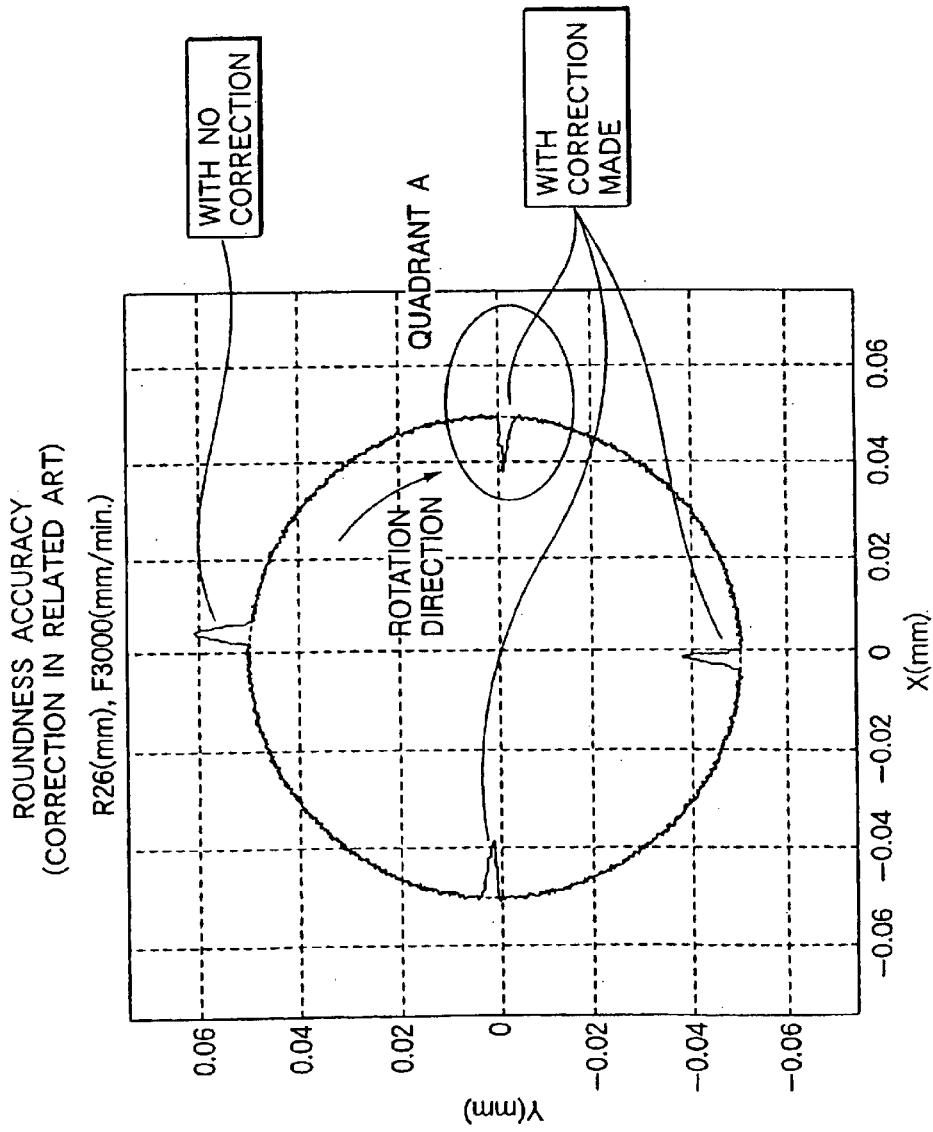
FIGS. 11A and 11B are drawings to show the simulation result when the servo control apparatus in the related art is applied to a machine system with large elastic change.
Figure 11B:
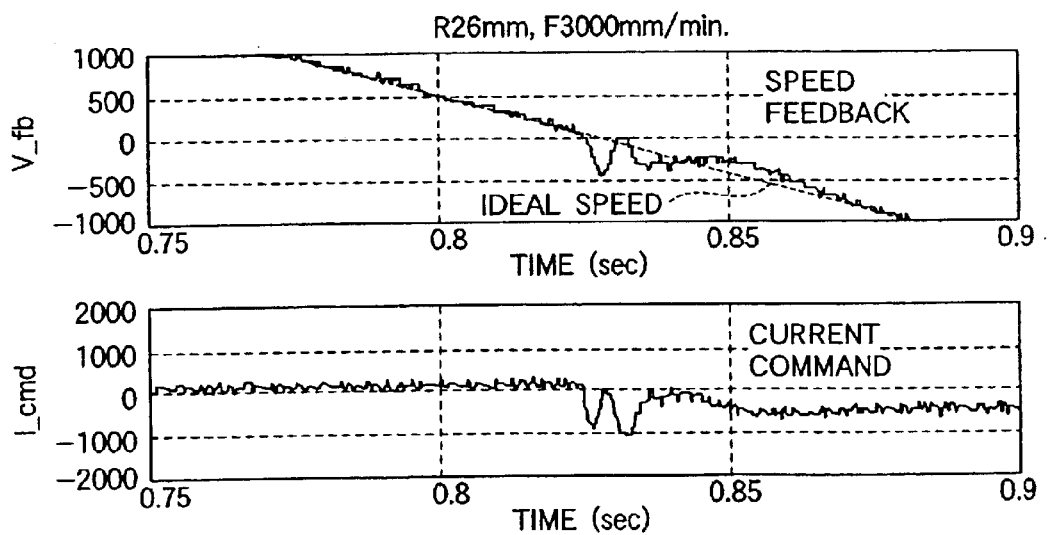
Figure 12:
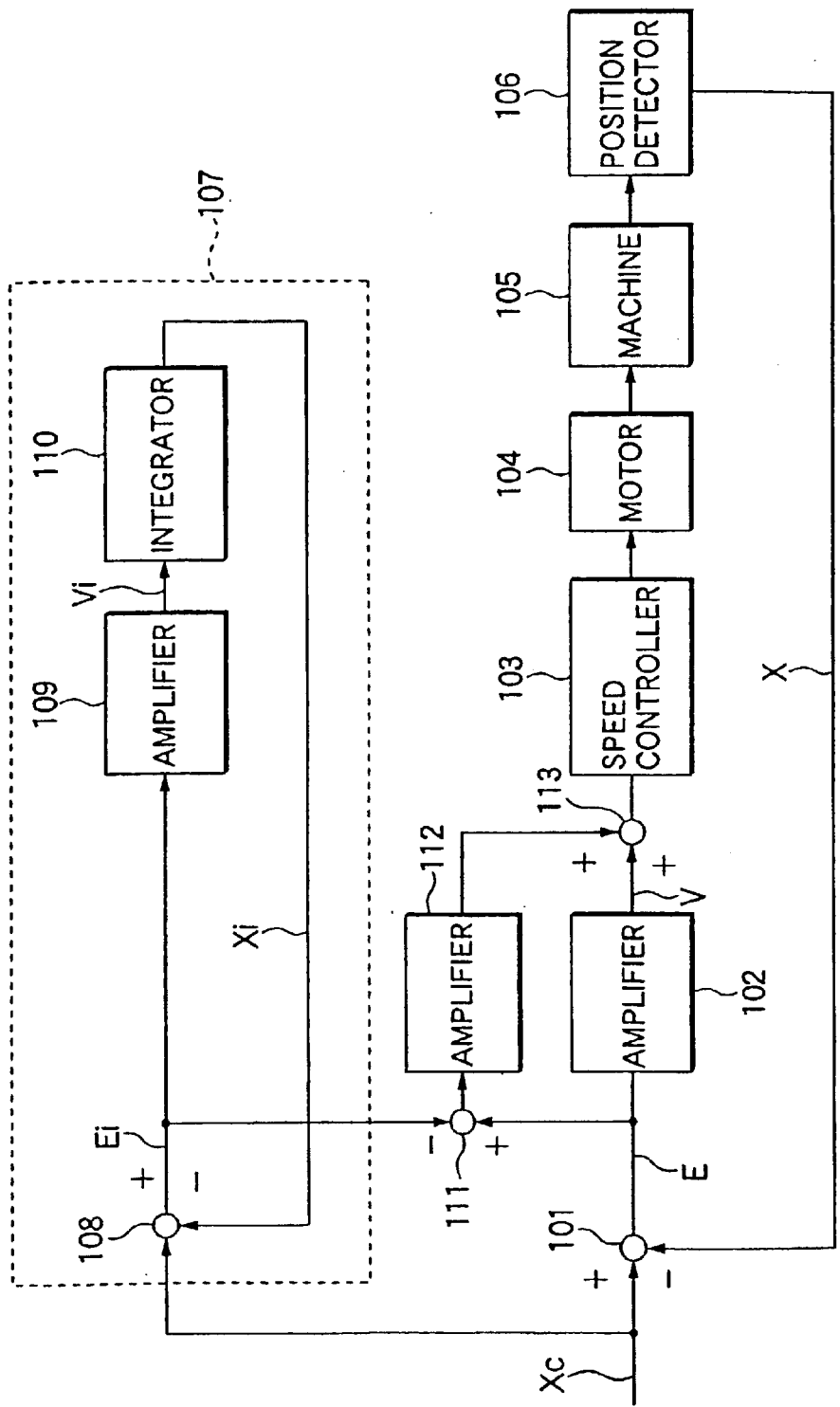
FIG. 12 is a block diagram to show a servo control apparatus in another related art.
Figure 13B:
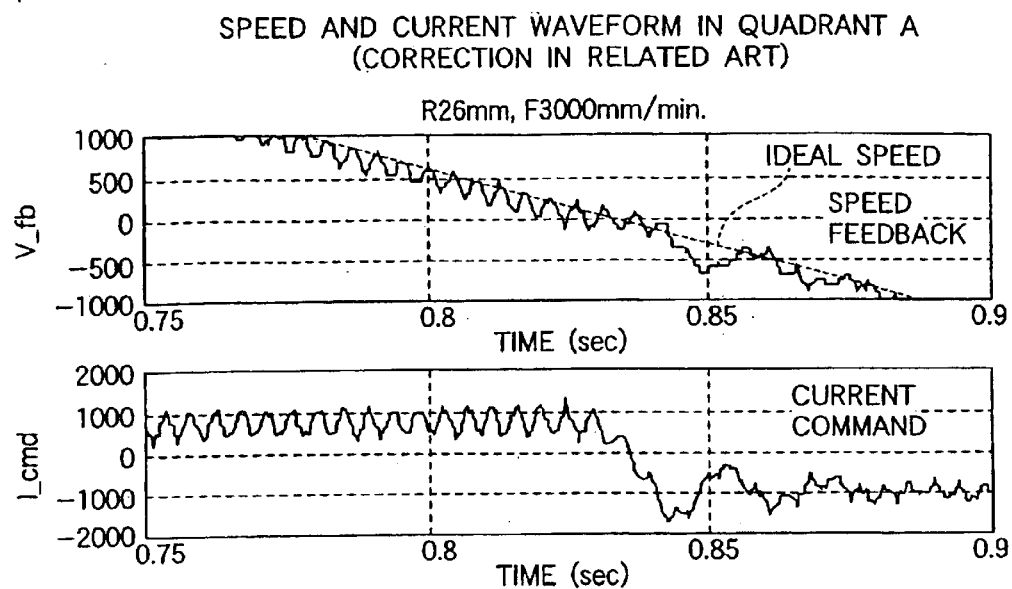
Figure 13C:
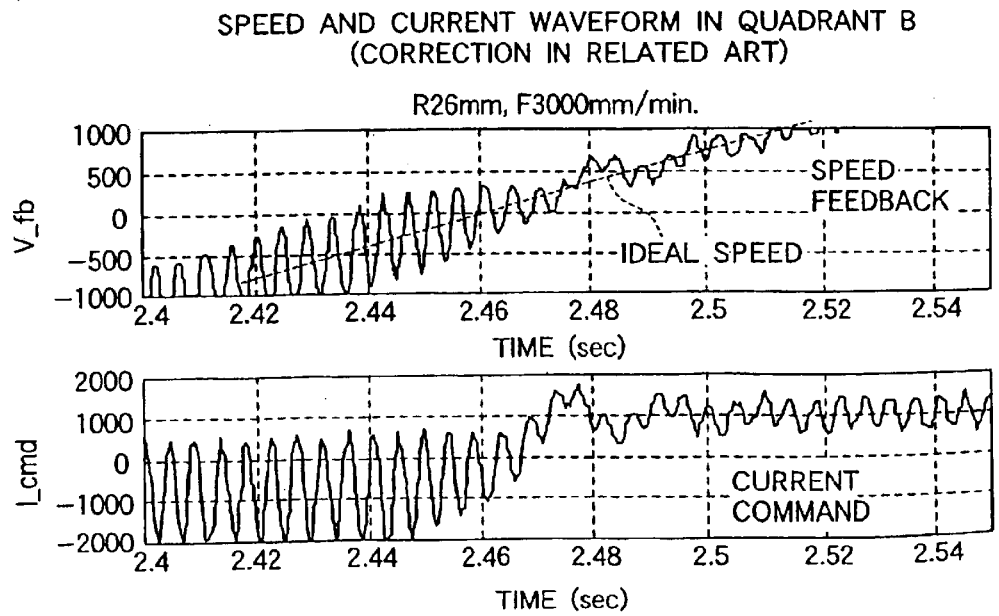

FIGS. 2A to 2C show the simulation result indicating the effect produced when the correction of the embodiment is made to a machine system with large elastic change. It is seen that since the correction amount is determined in response to an error occurring for each instant, such undercut, etc., occurring at the correcting time in the related art shown in FIGS. 11A and 11B is also suppressed and that machine vibration is not induced and stable and high-accuracy correction effect can be provided as compared with the result of making the correction in the invention of the numerical control apparatus disclosed in JP-A-1-276315.

Embodiment 2

FIG. 3 is a block diagram of a servo control apparatus according to an embodiment 2 of the invention.

The embodiment 2 is provided by changing the gain by which the multiplication section 42 multiplies the difference 27 between the position 26 of the ideal model and the actual position feedback 10 after direction reversing in the embodiment 1 to a gain 28A attenuated based on a time function as the maximum value at the direction reversing time or a function of the ideal model position (to perform actual operations concisely, inclination may be constant, but to attach importance to local correction in direction reversing, attenuation based on exponential attenuation, etc., is also effective).

Other components are similar to those in the embodiment 1.

The servo control apparatus according to the embodiment 2 of the invention is configured as described above and the operation of the servo control apparatus is as follows: The time when the direction of the ideal model changes is adopted as correction start timing and a multiplication section 42 multiplies a difference 27 between a position 26 of an ideal model and actual position feedback 10 by the gain 28A (gain attenuated based on the time function as the maximum value at the direction reversing time or the function of the ideal model position), thereby generating a speed command correction value 29, and an addition section 43 adds the correction value 29 to a speed command 11 of position control output.

Figure 4A:
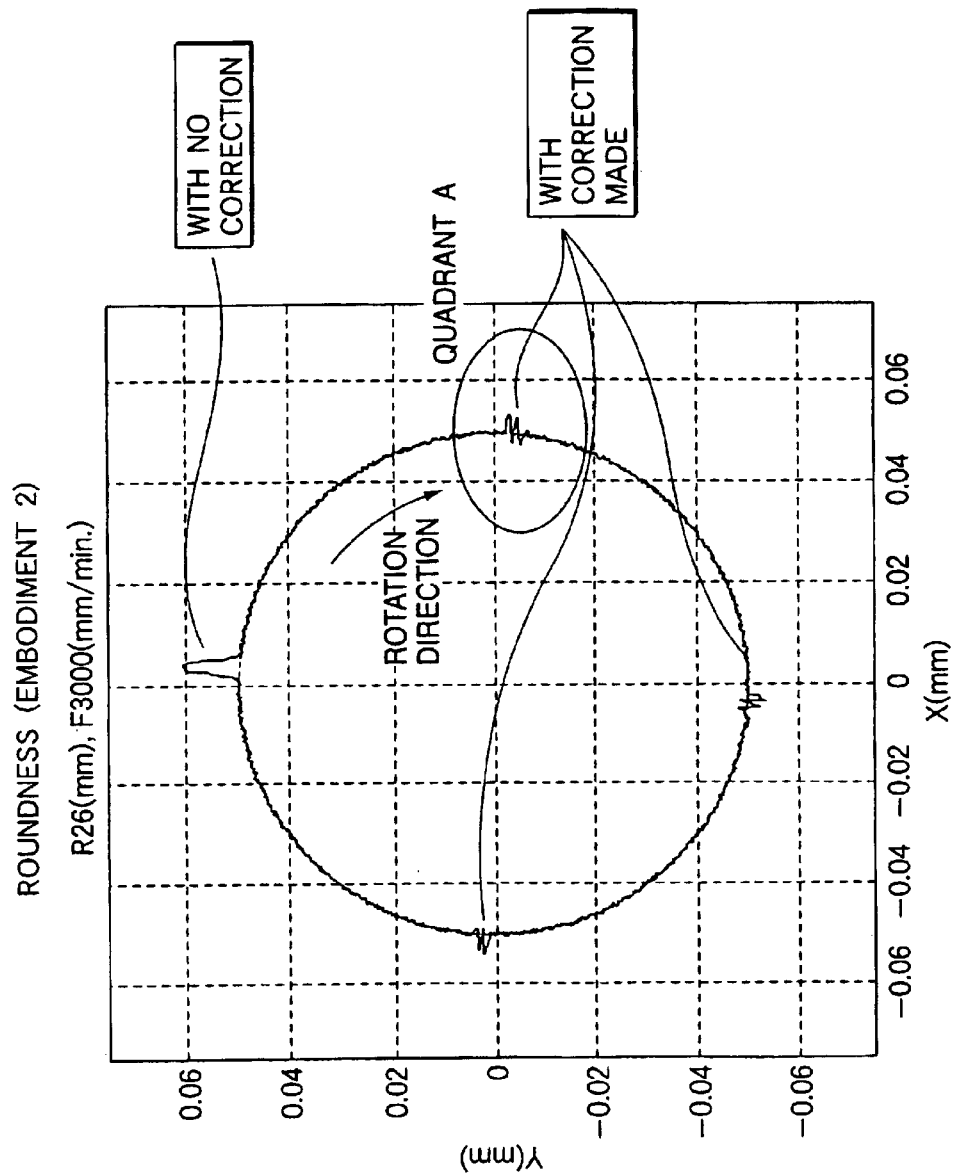

FIGS. 4A and 4B show the simulation result indicating the effect produced when the correction of the embodiment is made. Since the weight of the gain of the correction amount can be raised intensively at the direction inversing time, it is furthermore hard to induce machine vibration and it is made possible to enhance the correction effect.

Embodiment 3

Figure 5:
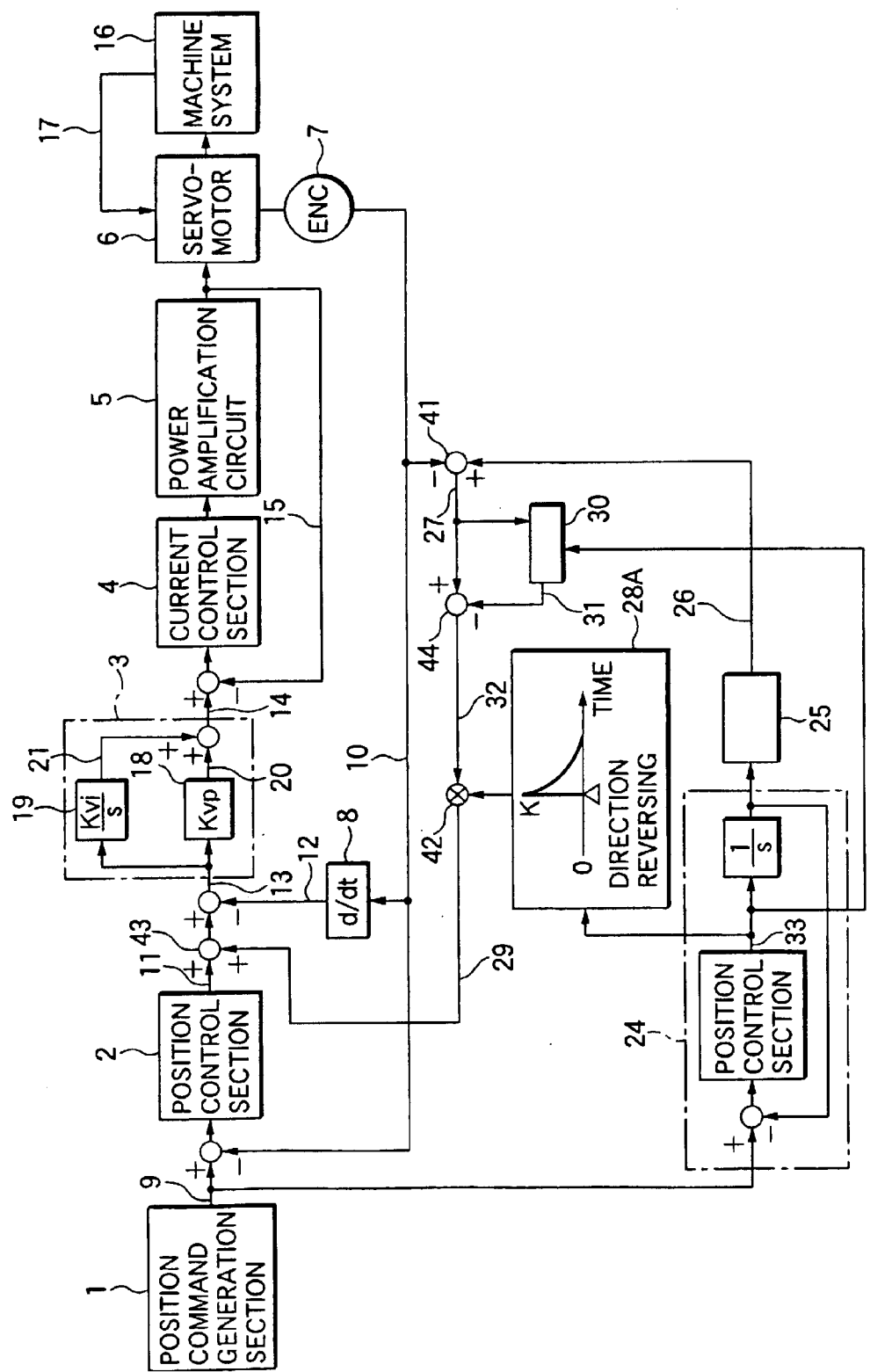
FIG. 5 is a block diagram to show a servo control apparatus according to an embodiment 3 of the invention.

FIG. 5 is a block diagram of a servo control apparatus according to an embodiment 3 of the invention.

In the figure, numeral 30 denotes a storage section for storing a difference 27 between a position 26 of an ideal model and actual position feedback 10 just after direction reversing as an offset value 31. The old offset value 31 is overwritten with new each time the direction is reversed. Numeral 44 denotes a subtraction section for outputting a difference 32 between the difference 27 between the position 26 of the ideal model and the actual position feedback 10 after direction reversing and the offset value 31. Other components are similar to those in the embodiment 2.

The servo control apparatus according to the embodiment 3 of the invention is configured as described above and the operation of the servo control apparatus is as follows: To begin with, the difference 27 between the position 26 of the ideal model and the actual position feedback 10 just after direction reversing is stored in the storage section 30 as the offset value 31. The subtraction section 38 subtracts the offset value 31 from the difference 27 between the position 26 of the ideal model and the actual position feedback 10 after direction reversing, a multiplication section 42 multiplies the provided difference 32 by a gain 28A (gain attenuated based on a time function as the maximum value at the direction reversing time or a function of the ideal model position), thereby generating a speed command correction value 29, and an addition section 37 adds the correction value 29 to a speed command 11 of position control output.

Accordingly, an error between the ideal model and actual motor or the position feedback of the machine system occurring due to a modeling error at the high-speed, high-acceleration operating time is removed and a correction is made only to the target error at the quadrant switching time and it is made possible to make stable adjustment for more enhancing the suppression effect of quadrantal projections.

Embodiment 4

Figure 6:
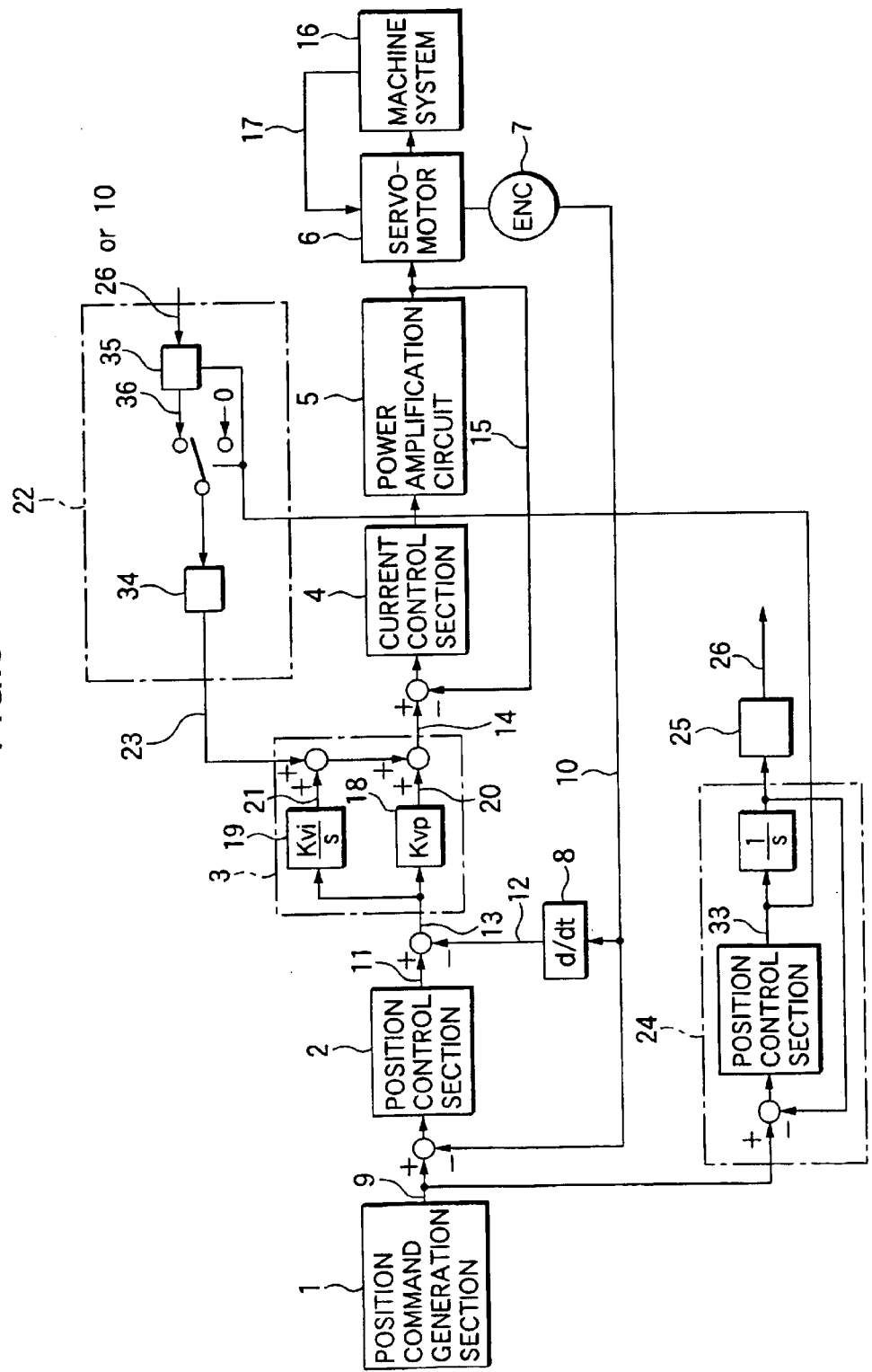
FIG. 6 is a block diagram to show a servo control apparatus according to an embodiment 4 of the invention.

FIG. 6 is a block diagram of a servo control apparatus according to an embodiment 4 of the invention.

In the figure, numeral 24 denotes an ideal model of a position loop system to which a position command 9 output from a position command generation section 1 is input, numeral 33 denotes an output speed signal of the ideal model 24 of the position loop system, numeral 25 denotes an ideal model considering a delay of a machine system with large elastic change, numeral 35 denotes a calculator for detecting direction reversing based on the model speed signal 33 generated from the ideal model 24 of the position loop system and upon detection of direction reversing, calculating a position 36 from the direction reversing from a position feedback value with the position at the direction reversing time as 0 (as the position feedback value, essentially it is desirable that actual position feedback 10 should be used, but if the position feedback resolution is coarse, etc., the correction amount becomes like vibration and there is a possibility that machine resonance may be induced; thus, in such a case, the cumulative position of output position 26 of the ideal model maybe used), and numeral 34 denotes a spring constant for compensating for torsion caused by elastic deformation of a ball spring, an oil seal, etc., in a machine system, the spring constant by which the calculation value provided by the calculator 35 is multiplied to generate a current command correction value 23.

Figure 9:
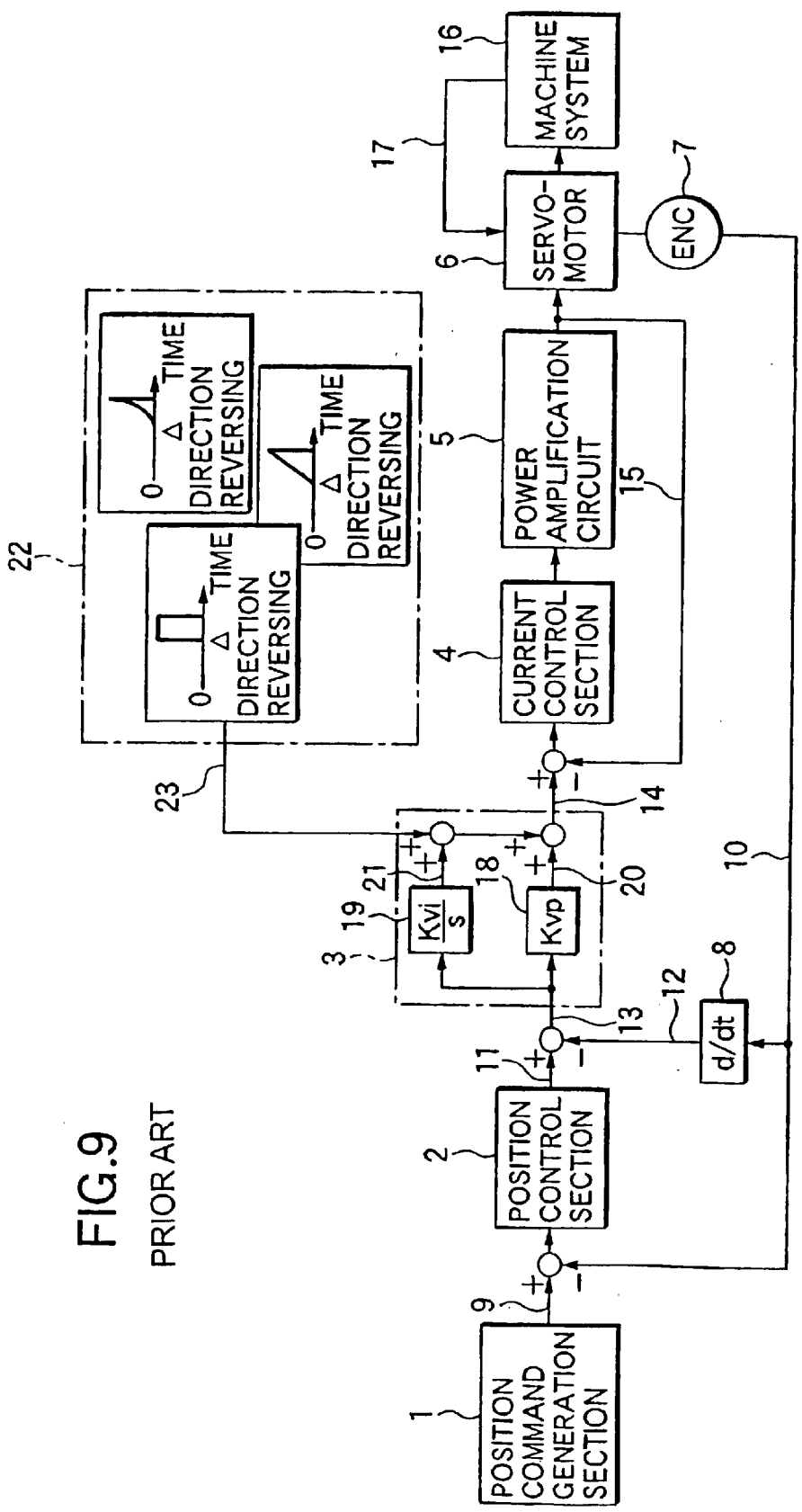
FIG. 9 is a block diagram to show a servo control apparatus in a related art.

The same numerals as those shown in FIG. 9 denote similar components to those shown in FIG. 9.

The servo control apparatus according to the embodiment 4 of the invention is configured as described above. Direction reversing is detected based on the model speed signal 33 generated from the ideal model 24 of the position loop system and upon detection of direction reversing, the calculator 35 calculates the position 36 from the direction reversing from the position feedback 10 with the position at the direction reversing time as 0 (or the cumulative position of the output position 26 of the ideal model), and the value is multiplied by the spring constant 34 for compensating for torsion caused by elastic deformation of the ball spring, the oil seal, etc., in the machine system to generate the current command correction value 23. The correction value is added to a speed proportional term command 20 and a speed integration term command 21 until it exceeds the static friction amount or until the total current command to which the correction amount is added exceeds the static friction amount.

Accordingly, correction proportional to the cumulative position from the direction reversing is made so as to cancel the load torque in the machine with large spring-based elements such as torsion of a ball spring, undercut caused by overcorrection or the like is also made hard to occur for the machine system having spring elements such as elastic deformation, and it is also made possible to make a stable correction to speed change, change in frictional load, etc.

Embodiment 5

Figure 7:
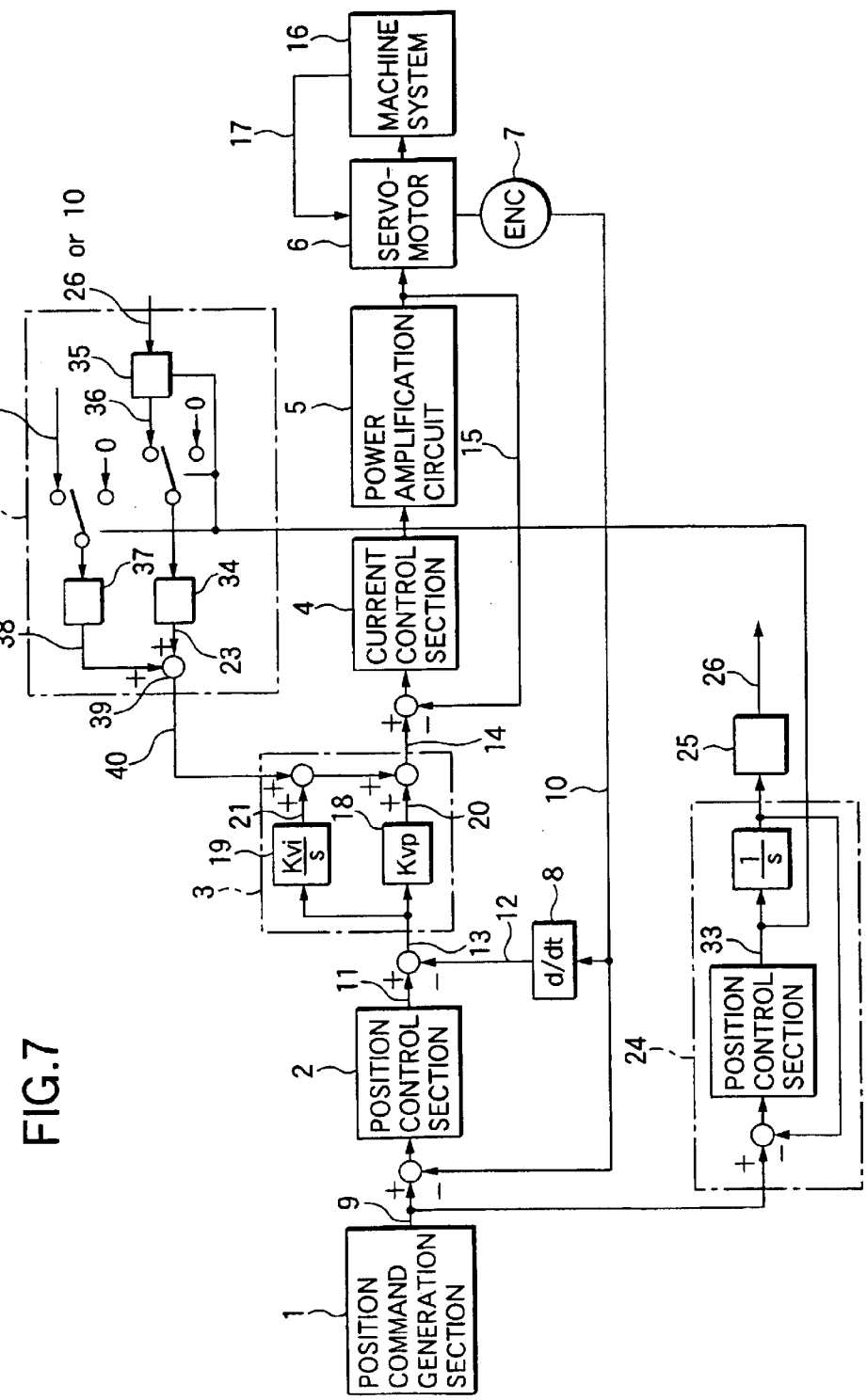
FIG. 7 is a block diagram to show a servo control apparatus according to an embodiment 5 of the invention.

FIG. 7 is a block diagram of a servo control apparatus according to an embodiment 5 of the invention.

In the figure, numeral 37 denotes a viscosity constant for compensating for a viscous frication term occurring in the rotation part of a ball screw, an oil seal, etc., in a machine system, upon detection of direction reversing based on a model speed signal 33 generated from a model position loop, the viscosity constant by which a speed feedback value (as the speed feedback value, essentially it is desirable that actual speed feedback 12 should be used, but if the speed feedback resolution is coarse, etc., the correction amount becomes like vibration and there is a possibility that machine resonance maybe induced; thus, in such a case, the output speed signal 33 of the ideal model may be used) is multiplied to generate a current command correction value 38, and numeral 39 denotes an addition section for adding current command correction value 23 described in the embodiment 4 and the above-mentioned current command correction value 38 and outputting a current command correction value 40. Other components are similar to those in the embodiment 4.

The servo control apparatus according to the embodiment 5 of the invention is configured as described above. Direction reversing is detected based on the model speed signal 33 generated from the ideal model 24 of the position loop system and upon detection of direction reversing, the calculator 35 calculates the position 36 from the direction reversing from the position feedback 10 with the position at the direction reversing time as 0 (or the cumulative position of the output position 26 of the ideal model), and the value is multiplied by the spring constant 34 for compensating for torsion caused by elastic deformation of the ball spring, the oil seal, etc., in the machine system to generate the current command correction value 23.

Direction reversing is detected based on the model speed signal 33 generated from the ideal model 24 of the position loop system and upon detection of direction reversing, with the position at the direction reversing time as 0, the speed feedback 12 (or the output speed 33 of the ideal model) is multiplied by the viscosity constant 37 for compensating for the viscous frication term occurring in the rotation part of the ball screw, the oil seal, etc., in the machine system, thereby generating the current command correction value 38.

The adder 39 adds the above-mentioned current command correction value 23 and the current command correction value 38 to generate the current command correction value 40. The correction value is added to a speed proportional term command 20 and a speed integration term command 21 until it exceeds the static friction amount or until the total current command to which the correction amount is added exceeds the static friction amount.

Accordingly, the correction based on the viscosity term which becomes dominant at the high-speed time is provided in addition to the correction based on the spring constant in the embodiment 4 effective for the direction reversing at low speed, so that it is made possible to make stabler higher-accuracy correction to speed change than that in the embodiment 4.

Embodiment 6

FIG. 8 is a block diagram of a servo control apparatus according to an embodiment 6 of the invention.

The embodiment 6 is provided by making the spring constant 34 of the term for compensating for the spring constant and the viscosity constant 37 for compensating for the viscosity term in the embodiment 5 the gain proportional to a difference (error) 27 between ideal model position 26 and actual position feedback 10.

Other components are similar to those in the embodiment 5.

Accordingly, correction proportional to the cumulative position from direction reversing is made so as to cancel the load torque in a machine with large spring-based elements such as torsion of a ball spring, undercut caused by over-correction or the like is also made hard to occur for a machine system having spring elements such as elastic deformation, and it is also made possible to make a stable correction to speed change, change in frictional load, etc., and in addition, the spring constant and the viscosity constant for determining the correction amount are made variable based on the error from the ideal position, so that a system that can also deal with secular variations of the spring constant and the viscosity constant and machine condition change can be constructed.

In the embodiment 6, only either of the spring constant 34 of the term for compensating for the spring constant and the viscosity constant 37 for compensating for the viscosity term can also be made the gain proportional to the difference 27 between the ideal model position 26 and the actual position feedback 10.

As described above, according to the invention, the ideal position is calculated based on the ideal servo system model, the difference between the calculated ideal position and the actual position feedback is multiplied by the predetermined gain only for the predetermined time from the direction reversing time of the ideal position, and the result is added to the above-mentioned speed command as the correction amount. Thus, variations in the correction effect, caused by the effect of the secular variation of the friction amount and the work condition difference can be suppressed and even in the machine system with large elastic change in torsion of a ball screw, a seal material, etc., it is made possible to suppress undercut caused by torsion restoration after the correction, etc. Moreover, the servo system can be prevented from becoming unstable and stable correction is made possible.

According to the invention, as the above-mentioned gain, the gain attenuated in the predetermined time is used as the maximum value at the direction reversing time of the ideal position, so that the servo system can be further inhibited from becoming unstable and higher-accuracy correction is made possible.

According to the invention, the difference between the ideal position and the actual position feedback at the direction reversing time of the ideal position is stored as the offset value and the offset value is subtracted from the above-mentioned difference and the subtraction result is multiplied by the above-mentioned gain. Thus, the error between the ideal model and the actual motor or the position feedback of the machine system occurring due to a modeling error at the high-speed, high-acceleration operating time can be removed and a correction is made only to the target error at the quadrant switching time and it is made possible to make stable adjustment for more enhancing the suppression effect of quadrantal projections. This becomes an effective solution to the fact that like the simulation result of the behavior when the correction disclosed in JP-A-1-276315 is made, a correction made to any error other than the target with a high gain (amplification value) easily induces machine vibration and resonance and consequently only a correction with a low gain can be made.

According to the invention, the ideal position is calculated based on the ideal servo system model, the above-mentioned position feedback or the cumulative position of the ideal servo system model is multiplied by the predetermined gain only for the predetermined time from the direction reversing time of the calculated ideal position, and the result is added to the above-mentioned current command as the correction amount. Thus, correction proportional to the cumulative position from the direction reversing is made so as to cancel the load torque in the machine with large spring-based elements such as torsion of a ball spring, undercut caused by overcorrection or the like is also made hard to occur for the machine system having spring elements such as elastic deformation, and it is also made possible to make a stable correction to speed change, change in frictional load, etc.

According to the invention, the above-mentioned speed feedback or the speed of the ideal servo system model is multiplied by the predetermined gain only for the predetermined time from the direction reversing time of the ideal position and the result is added to the above-mentioned current command as the correction amount. Thus, the correction based on the viscosity term which becomes dominant at the high-speed time is provided, so that it is made possible to make stabler higher-accuracy correction to speed change than the above-mentioned spring-based element correction.

According to the invention, the coefficient proportional to the difference between the ideal position and the actual feedback position is used as the above-mentioned gain. Thus, correction proportional to the cumulative position from direction reversing is made so as to cancel the load torque in a machine with large spring-based elements such as torsion of a ball spring, undercut caused by overcorrection or the like is also made hard to occur for a machine system having spring elements such as elastic deformation, and it is also made possible to make a stable correction to speed change, change in frictional load, etc., and in addition, the spring constant and the viscosity constant for determining the correction amount are made variable based on the error from the ideal position, so that a system that can also deal with secular variations of the spring constant and the viscosity constant and machine condition change can be constructed.

Industrial Applicability

As described above, the servo control method and its apparatus according to the invention are fitted for use in servo control of a machine system with large elastic change in torsion of a ball screw, a seal material, etc.

What is claimed is:

1. A servo control method comprising the steps of generating a speed command based on a difference between a position command and actual position feedback, generating a current command based on a difference between the speed command and actual speed feedback, and controlling a servomotor based on the current command; wherein an ideal position is calculated based on an ideal servo system model, and a difference between the calculated ideal position and the actual position feedback is multiplied by a predetermined gain only for a predetermined time from a direction reversing time of the ideal position, and the result of this multiplication is added to the speed command as a correction amount.

2. The servo control method as claimed in claim 1 wherein the above-mentioned gain is attenuated over a predetermined time from a maximum value at or after the direction reversing time of the ideal position.

3. The servo control method as claimed in claim 1 or 2 wherein the difference between the ideal position and the actual position feedback at the direction reversing time of the ideal position is stored as an offset value, the offset value is subtracted from the difference, and the subtraction result is multiplied by the gain.

4. A servo control method comprising the steps of generating a speed command based on a difference between a position command and actual position feedback, generating a current command based on a difference between the speed command and actual speed feedback, and controlling a servomotor based on the current command; wherein an ideal position is calculated based on an ideal servo system model, and the position feedback or a cumulative position of the ideal servo system model is multiplied by a predetermined gain only for a predetermined time from a direction reversing time of the calculated ideal position, and the result of the multiplication is added to the current command as a correction amount.

5. The servo control method as claimed in claim 4 wherein the speed feedback or speed of the ideal servo system model is multiplied by a second predetermined gain only for a predetermined time from the direction reversing time of the ideal position and the result is added to the current command as the correction amount.

6. The servo control method as claimed in claim 4 or 5 wherein a coefficient proportional to the difference between the ideal position and the actual feedback position is used as the gain.

7. The servo control method as claimed in claim 1, wherein the ideal servo system model is a model considering a delay of a position loop system from the position command to the position feedback and a mechanical delay of an object to be controlled.

8. The servo control method as claimed in claim 2, wherein the ideal servo system model is a model considering a delay of a position loop system from the position command to the position feedback and a mechanical delay of an object to be controlled.

9. The servo control method as claimed in claim 3, wherein the ideal servo system model is a model considering a delay of a position loop system from the position command to the position feedback and a mechanical delay of an object to be controlled.

10. The servo control method as claimed in claim 4, wherein the ideal servo system model is a model considering a delay of a position loop system from the position command to the position feedback and a mechanical delay of an object to be controlled.

11. The servo control method as claimed in claim 5, wherein the ideal servo system model is a model considering a delay of a position loop system from the position command to the position feedback and a mechanical delay of an object to be controlled.

12. The servo control method as claimed in claim 6, wherein the ideal servo system model is a model considering a delay of a position loop system from the position command to the position feedback and a mechanical delay of an object to be controlled.

13. A servo control apparatus comprising means for detecting a position and speed of a servomotor, a position control section for generating a speed command based on a difference between a position command and actual position feedback, a speed control section for generating a current command based on a difference between the speed command and actual speed feedback, and a current control section for controlling an electric current allowed to flow into the servomotor based on the current command for controlling the above-mentioned servomotor; the servo control apparatus further comprising an ideal servo system model, subtraction means for outputting a difference signal between an ideal position calculated by the model and the actual position feedback, and means for multiplying the difference signal output by the subtraction means by a predetermined gain only for a predetermined time from a direction reversing time of the ideal position and adding the result to the speed command as a correction amount.

14. The servo control apparatus as claimed in claim 13 wherein the gain is attenuated over a predetermined time from a maximum value at or after the direction reversing time of the ideal position.

15. The servo control apparatus as claimed in claim 13 or 14 comprising storage means for storing the difference between the ideal position and the actual position feedback at the direction reversing time of the ideal position as an offset value and subtraction means for subtracting the offset value stored in the storage means from the difference, wherein the subtraction result provided by the subtraction means is multiplied by the gain.

16. A servo control apparatus comprising means for detecting a position and speed of a servomotor, a position control section for generating a speed command based on a difference between a position command and actual position feedback, a speed control section for generating a current command based on a difference between the speed command and actual speed feedback, and a current control section for controlling an electric current allowed to flow into the servomotor based on the above-mentioned current command for controlling the servomotor; the servo control apparatus further comprising an ideal servo system model and means for multiplying the above-mentioned position feedback or a cumulative position of the ideal servo system model by a predetermined gain only for a predetermined time from a direction reversing time of the ideal position of the model and adding the result of the multiplication to the current command as a correction amount.

17. The servo control apparatus as claimed in claim 16 comprising means for multiplying the speed feedback or speed of the ideal servo system model by a second predetermined gain only for a predetermined time from the direction reversing time of the ideal position of the model and adding the result to the current command as the correction amount.

18. The servo apparatus as claimed in claim 16 or 17 wherein a coefficient proportional to the difference between the ideal position and the actual feedback position is used as the gain.

19. The servo control apparatus as claimed in claim 13, wherein the ideal servo system model is a model considering a delay of a position loop system from the position command to the position feedback and a mechanical delay of an object to be controlled.

20. The servo control apparatus as claimed in claim 14, wherein the ideal servo system model is a model considering a delay of a position loop system from the position command to the position feedback and a mechanical delay of an object to be controlled.

21. The servo control apparatus as claimed in claim 15, wherein the ideal servo system model is a model considering a delay of a position loop system from the position command to the position feedback and a mechanical delay of an object to be controlled.

22. The servo control apparatus as claimed in claim 16, wherein the ideal servo system model is a model considering a delay of a position loop system from the position command to the position feedback and a mechanical delay of an object to be controlled.

23. The servo control apparatus as claimed in claim 17, wherein the ideal servo system model is a model considering a delay of a position loop system from the position command to the position feedback and a mechanical delay of an object to be controlled.

24. The servo control apparatus as claimed in claim 18, wherein the ideal servo system model is a model considering a delay of a position loop system from the position command to the position feedback and a mechanical delay of an object to be controlled.

* * * * *